US011531877B2

(12) United States Patent
Zhang et al.

(10) Patent No.: US 11,531,877 B2
(45) Date of Patent: Dec. 20, 2022

(54) SYSTEM AND METHOD OF DEPLOYING AN ARTIFICIAL NEURAL NETWORK ON A TARGET DEVICE

(71) Applicant: University of Pittsburgh—Of the Commonwealth System of Higher Education, Pittsburgh, PA (US)

(72) Inventors: Youtao Zhang, Pittsburgh, PA (US); Lei Zhao, Pittsburgh, PA (US); Jun Yang, Pittsburgh, PA (US); Shuai Ding, Hefei (CN)

(73) Assignees: University of Pittsburgh—Of The Commonwealth System of Higher Education, Pittsburgh, PA (US); Hefei University of Technology, Hefei (CN)

( * ) Notice: Subject to any disclaimer, the term of this patent is extended or adjusted under 35 U.S.C. 154(b) by 1058 days.

(21) Appl. No.: 16/164,964

(22) Filed: Oct. 19, 2018

(65) Prior Publication Data
US 2019/0147344 A1 May 16, 2019

Related U.S. Application Data

(60) Provisional application No. 62/584,142, filed on Nov. 10, 2017.

(51) Int. Cl.
G06N 3/08 (2006.01)
G06N 3/10 (2006.01)

(52) U.S. Cl.
CPC ............... *G06N 3/08* (2013.01); *G06N 3/10* (2013.01)

(58) Field of Classification Search
CPC ..................... G06N 3/08; G06N 3/10
See application file for complete search history.

(56) References Cited

U.S. PATENT DOCUMENTS

2019/0362232 A1* 11/2019 Nagai .................... G06N 3/084

OTHER PUBLICATIONS

Uchida, Yusuke, et al. "Embedding watermarks into deep neural networks." Proceedings of the 2017 ACM on International Conference on Multimedia Retrieval. Jun. 2017. (Year: 2017).*
Bojinov, Hristo, et al. "Mobile device identification via sensor fingerprinting." arXiv preprint arXiv: 1408.1416 (Aug. 2014). (Year: 2014).*

* cited by examiner

*Primary Examiner* — Benjamin P Geib
(74) *Attorney, Agent, or Firm* — Philip E. Levy; Eckert Seamans Cherin & Mellott, LLC

(57) ABSTRACT

A method of deploying a neural network on a target device method includes extracting a number of device dependent error masks from the target device, using the number of device dependent error masks in a training phase of the neural network to generate a device dependent weight matrix for the neural network, and storing the device dependent weight matrix in the target device for use by the target device to perform inference tasks using the neural network.

17 Claims, 3 Drawing Sheets

SYSTEM AND METHOD OF DEPLOYING AN ARTIFICIAL NEURAL NETWORK ON A TARGET DEVICE

CROSS-REFERENCE TO RELATED APPLICATIONS

This application claims priority under 35 U.S.C. § 119(e) from U.S. provisional patent application No. 62/584,142, entitled "System and Method of Deploying an Artificial Neural Network on a Target Device" and filed on Nov. 10, 2017, the contents of which are incorporated herein by reference.

BACKGROUND OF THE INVENTION

1. Field of the Invention

The present invention relates to neural networks, and, in particular, to a system and method of deploying an artificial neural network on a target device using device dependent weight matrices.

2. Description of the Related Art

A neural network (also sometimes referred to as an artificial neural network) is a machine learning approach that, by exploiting the significant increase of computing power of modern computers, achieves superior inference accuracy improvements over traditional machine learning approaches. As a result, neural networks have recently gained popularity in a wide range of modern application domains, such as, without limitation, computer vision and speech recognition.

Neural networks consist of a number of interconnected artificial neurons, referred to as nodes, that are organized into multiple layers. More specifically, a typical neural network includes an input layer which receives the input to be processed, one or more hidden layers that perform processing via a system of connections, and an output layer linked to the hidden layers. The connections employed in each of the hidden layers are weighted, and each layer therefore employs a set of weights, referred to as a weight matrix. Thus, a typical neural network is composed of its layer structure as well as the corresponding weight matrices in each layer.

Furthermore, a neural network has two different computing phases, namely a training phase and an inference phase. The training phase is used to adjust the weights of each layer to make the neural network fit a specific function. The trained weights are then used in the inference phase to perform tasks, such as image classification, speech recognition, etc.

With growing problem size and complexity, modern neural networks, such as convolutional neural networks and deep neural networks, contain a large number of weights. Such networks require tremendous efforts to not only prepare representative training datasets, but also to train the network to generate the trained weight matrices. As a result, there is an increasing demand to protect the trained neural network weight matrices from piracy when they are deployed in a client side device. However, adopting conventional protection methods, such as encryption, to protect the trained neural network weight matrices presents significant performance and energy consumption problems.

SUMMARY OF THE INVENTION

In one embodiment, a method of deploying a neural network on a target device is provided. The method includes extracting a number of device dependent error masks from the target device, using the number of device dependent error masks in a training phase of the neural network to generate a device dependent weight matrix for the neural network, and storing the device dependent weight matrix in the target device for use by the target device to perform inference tasks using the neural network.

In another embodiment, an electronic device configured to implement a neural network is provided. The electronic device includes a processing portion and a memory portion. The memory portion stores a device dependent weight matrix for use by the processing portion to perform inference tasks using the neural network, wherein the device dependent weight matrix is based on a number of device dependent error masks extracted from the electronic device.

DETAILED DESCRIPTION OF EXEMPLARY EMBODIMENTS

Figure 1:
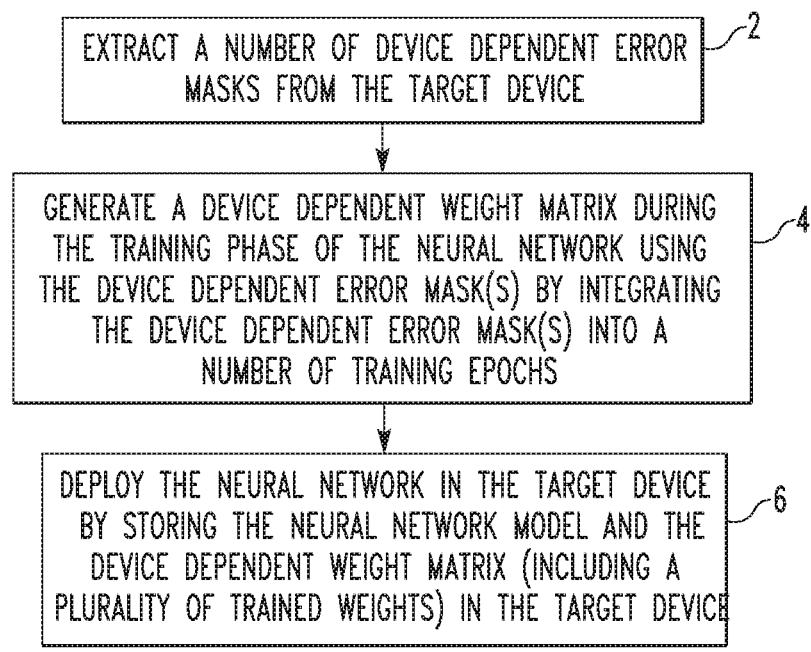
FIG. 1 is a flowchart illustrating a methodology for deploying an artificial neural network on a target device according to an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the term "device dependent error mask" shall mean an array (including one or more rows and one or more columns) of binary values obtained from an electronic device by operating the electronic device according to one or more predetermined parameters such that the binary values are particular to the electronic device based on the specific hardware of the electronic device.

As used herein, the term "device dependent weigh matrix" shall mean a plurality of trained weights for a neural network created during a training phase of the neural network by integrating a device dependent error mask into one or more training epochs of the training phase of the neural network.

As used herein, the term "weight storing DRAM cells" shall mean the set of storage cells in a DRAM in which the device dependent weight matrix (i.e., the binary values representing the device dependent weight matrix) is stored.

As used herein, the term "restore duration time" shall mean the length of time during which a DRAM cell is refilled with charge during a restore operation of the DRAM device, and may include, for example and without limitation, tRAS timing as defined in the Joint Electron Device Engineering Council (JEDEC) standard.

As used herein, the term "stuck below threshold" shall mean, for a DRAM cell that is configured to store a particular binary value if an amount of stored charge in the DRAM cell is above a predetermined threshold, that the DRAM cell is unable to be refilled with enough charge during the restore duration time to exceed the predetermined threshold.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of this innovation.

As described in greater detail herein, the disclosed concept enables effective protection of trained neural network weight matrices through the use of device (i.e., target device) dependent weight matrices that are based on a hardware signature of the target device. Adopting such weights achieves high inference accuracy only on the target device. For this purpose, according to the disclosed concept, a number of device dependent error masks are generated from the target device and are integrated in the neural network training phase to generate device dependent weight matrices that are ultimately deployed to the target device. In addition, in the exemplary embodiment, batch normalization is also used to effectively mitigate the impact of errors during training. The incorporation of the device dependent error mask(s) in the neural network training process so that the trained weights are device dependent effectively protects the trained weight against piracy since exporting the weights to other devices cannot produce satisfactory inference accuracy.

In one particular implementation described herein, the target device in which the neural network is deployed comprises a neural network accelerator that employs dynamic random access memory (DRAM) as the main memory. In this particular implementation, the disclosed concept reduces DRAM timing to generate a number of device dependent error masks in the form of a set of erroneous cells wherein the distribution of the erroneous cells is device dependent due to process variations in manufacturing the DRAM. The device dependent error masks are then used to create a device dependent weight matrix that is deployed to the target device. In one particular exemplary implementation, the disclosed concept also includes a table driven DRAM timing parameter adjustment mechanism to defeat probing attacks.

The present inventors have found that the above described particular implementation of the disclosed concept speeds up neural network inference and achieves significant energy reduction due to the fact that main memory dominates the energy consumption in neural network accelerators. In particular, according to an aspect of the disclosed concept, the same reduced DRAM timing parameter that was used to create the device dependent error mask(s) is used during read operations of the DRAM main memory to perform inference tasks. Results show that by injecting 0.1% to 5% memory errors during generation of the device dependent error mask(s), the disclosed concept has negligible inference accuracy loss on the target device while exhibiting unacceptable accuracy degradation on other devices. In addition, an average of 72% performance improvement and 44% energy reduction over a baseline neural network accelerator has been observed.

FIG. 1 is a flowchart illustrating a methodology for deploying an artificial neural network on a target device such as, without limitation, a neural network accelerator, according to an exemplary embodiment of the disclosed concept. Referring to FIG. 1, the methodology begins at step 2, wherein a number of device dependent error masks are extracted from the target device. Next, at step 4, a device dependent weight matrix is generated for the target device using the extracted device dependent error mask(s). In particular, the device dependent weight matrix is generated during the training phase of the neural network by integrating the device dependent error mask(s) into a number of training epochs of the neural network. Then, at step 6, the neural network is deployed in the target device by storing the neural network model and the device dependent weight matrix in the memory of the target device. Thereafter, the target device will use the stored device dependent weight matrix to perform inference tasks using the deployed neural network.

As described in detail elsewhere herein in connection with one particular embodiment (FIG. 4), the method of FIG. 1 may be used to deploy a neural network to multiple devices during large scale manufacturing. In such a situation, each device will have a different set of device dependent error mask(s) that are separately extracted therefrom, which requires a separate training for each device. In the exemplary embodiment, this problem is addressed by first training the neural network without any device dependent error mask(s) for a large number of epochs, then only separately training for each device with its device dependent error mask(s) for a small number of epochs. This can greatly reduce the training time for each device.

Figure 2:
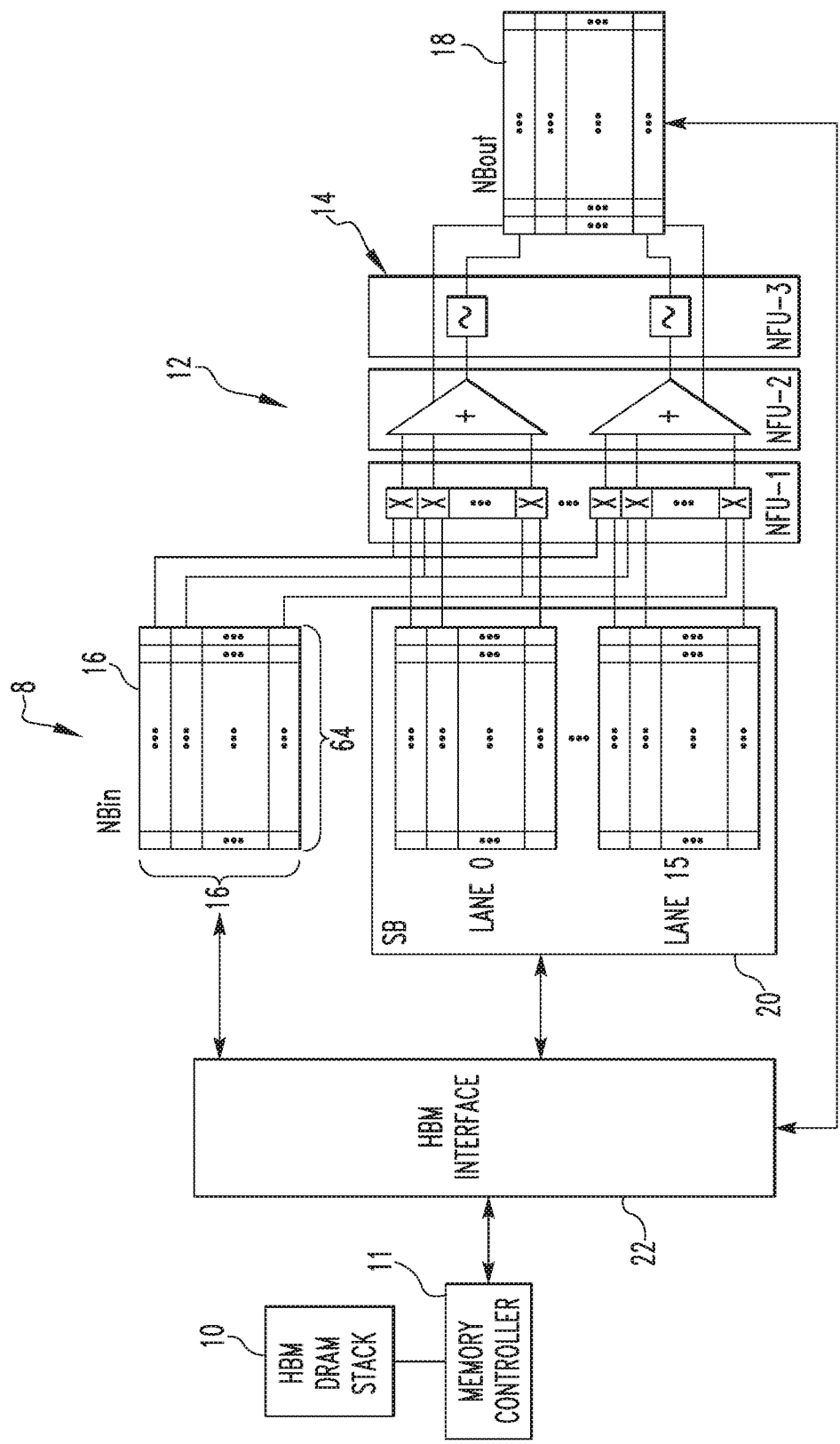
FIG. 2 is a schematic diagram of an exemplary target device having an artificial neural network deployed thereon according to an exemplary embodiment of the disclosed concept.

One particular, non-limiting embodiment of the methodology of FIG. 1 will now be described in connection with an exemplary target device 8 shown in FIG. 2. As seen in FIG. 2, target device 8 is a neural network accelerator device that includes a main memory in the form of a high bandwidth memory (HBM) DRAM stack 10 having a number of DRAM modules each comprising an array of storage cells. DRAM stack 10 is controlled by a memory controller 11. DRAM stack 10 is coupled to an application specific integrated circuit (ASIC) neural network accelerator 12. In the non-limiting illustrated exemplary embodiment, neural network accelerator 12 is the DianNao architecture that is described in T. Chen, et al., "DianNao: A Small-footprint High-throughput Accelerator For Ubiquitous Machine-learning," ASPLOS, 2014, although it will be appreciated that other architectures may be used within the scope of the disclosed concept. In such an exemplary embodiment, neural network accelerator 12 includes a number of neural functional units 14 and three SRAM buffers including an input buffer 16, an output buffer 18 and a synaptic buffer 20.

In target device 8, the device dependent weight matrix generated as described herein is stored in DRAM stack 10 and is provided to neural network accelerator 12 for use thereby for inference tasks through HBM interface 22. More specifically, the device dependent weight matrix generated as described herein will consist of a plurality of binary values and will be stored in weight storing DRAM cells (defined elsewhere herein) of DRAM stack 10. As described in more detail below, it is these weight storing DRAM cells that are used to create the device dependent error mask(s) for target device 8. The so created device dependent error mask(s) are then subsequently used to create the device dependent weight matrix that is ultimately stored in target device 8 in the same weight storing DRAM cells. However, before describing that process in detail, some background information on DRAM cells is first provided immediately below which will aid in the understanding of the process of the disclosed concept.

As is known in the art, a DRAM cell is able to hold some amount of electric charge. The binary value that the cell stores is represented by the amount of charge in the cell. For example, if the amount of charge in the cell is above a certain predetermined threshold, the cell is considered to store a binary value of "1", otherwise, the cell is considered to store a binary value of "0". The opposite is also possible, i.e., if the amount of charge in the cell is above a certain predetermined threshold, the cell is considered to store a binary value of "0", otherwise, the cell is considered to store a binary value of "1". Most current DRAM devices employ a mixed configuration wherein some cells will operate according to the former implementation while other cells operate according to the latter implementation. For example, a DRAM device may employ a mixed configuration by row, wherein even rows of DRAM cells store binary values of "1" as above threshold values and binary values of "0" as below threshold values, and odd rows store binary values of "0" as above the threshold values and binary values "1" as below threshold values.

In addition, it is also known that a DRAM read operation is destructive, meaning that after testing the amount of charge in the cell to determine the binary value stored by the cell, the charge will leak away. As a result. DRAM devices require an operation immediately after each read operation to refill (i.e., write back) the cell if the previous status of the cell is not empty (i.e., below threshold). This operation where data is written back into the cells is commonly referred to as a restore operation, and data is written back to each such cell for a restore duration time. Because each cell in a DRAM is not exactly the same (due to process variations), some cells need less time to be refilled (i.e., exceed threshold), while others may need more time to be refilled (i.e., exceed threshold). If the length of the restore duration time is reduced below a certain level, not enough charge can be written back into certain cells to pass the threshold. For those cells, the value of the cell will be changed after a read and subsequent restore. As described in greater detail herein, the disclosed concept utilizes this phenomenon wherein certain cells are stuck below threshold as a result of a reduced restore duration time to create a number of device dependent error masks for target device 8. More specifically, according to an aspect of the disclosed concept, the restore duration time is chosen such that a desired percentage of cells in DRAM stack 10 cannot be refilled with enough charge, and that chosen reduced restore duration time is used to create device dependent error mask(s) and ultimately a device dependent weight matrix in the methodology of FIG. 1.

More specifically, in the present particular exemplary embodiment, step 2 of the methodology of FIG. 1 includes generating two different device dependent error masks for target device 8 based on the weight storing DRAM cells of DRAM stack 10 and a particular, chosen restore duration time as described above. A first mask, designated M0, includes the following: (1) a binary value of "0" for each cell in the weight storing DRAM cells that (i) is configured to store a binary value of "1" as above threshold, and (ii) is determined to be unable to be refilled so as to have its charge be above threshold as a result of the restore duration time being reduced to a certain predetermined value (i.e., the chosen restore duration time) (such a cell is said to be "stuck at 0"), and (2) a binary value of "1" for all other cells in the weight storing DRAM cells. The first mask, M0, thus indicates each cell that is "stuck at 0" by including a binary value of "0" at the linear position(s) of those cells, with a binary value of "1" at all other positions. A second mask, designated M1, includes the following: (1) a binary value of "1" for each cell in the weight storing DRAM cells that (i) is configured to store a binary value of "0" as above threshold, and (ii) is determined to be unable to be refilled so as to have its charge be above threshold as a result of the restore duration time being reduced to the certain predetermined value (i.e., the chosen restore duration time) (such a cell is said to be "stuck at 1"), and (2) a binary value of "0" for all other cells in the weight storing DRAM cells. The second mask, M1, thus indicates each cell that is "stuck at 1" by including a binary value of "1" at the linear position(s) of those cells, with a binary value of "0" at all other positions.

To further illustrate such masks, a particular simplified example is provided. In this example, it is assumed that the weight storing DRAM cells of DRAM stack 10 include a total of ten cells labeled 1 through 10 (although it will be understood that many more will be employed in actual practice). In this example, cells 1, 2, 3, 8, 9 and 10 are configured to store binary value "0" as above threshold, and cells 4, 5, 6 and 7 are configured to store binary value "1" as above threshold. As a result, it is possible for cells 1, 2, 3, 8, 9 and 10 to be "stuck at 1" and for cells 4, 5, 6 and 7 to be "stuck at 0" as a result of the use of the reduced restore duration time. In the present example, it is assumed that cells 4 and 7 are "stuck at 0" cells, and that cells 1 and 10 are "stuck at 1" cells. Thus, in this example, M0 will take the form of 1110110111 and M1 will take the form of 1000000001.

Continuing with the present particular exemplary embodiment, step 4 of the methodology of FIG. 1 includes using the two different device dependent error masks, M0 and M1 described above (which are generated from exemplary target device 8), to generate a device dependent weight matrix for ultimate deployment to target device 8. As described in connection with FIG. 1 above, this involves using M0 and M1 during a number of training epochs of the neural network. One specific implementation of how this may be done according to the disclosed concept is described in detail below. To illustrate this specific implementation, the example masks M0=1110110111 and M1=1000000001 described above are used below.

The training process of neural networks is an iterative process. Thus, in the exemplary implementation being described, the weight matrix for the neural network to be deployed to target device 8 is first randomly initialized to, for example, W0=1010100101. Then, in the first iteration, W0 is used to do a forward propagation through the neural network, and the gradients are calculated for the iteration. The gradients are then used to update W0 to W1=1100101110. Next, the device dependent error masks M0 and M1 are applied to W1 to generate W1' by first performing a bitwise AND operation between M0 and W1 to create W1$_{intermediate}$, and then performing a bitwise OR operation between M1 and W1$_{intermediate}$. In the example, W1'=1100100111. In the second iteration, W1' is used to do the forward propagation through the neural network, and the gradients are calculated for the iteration. The gradients are then used to update W1 to W2=0010100111. Next, the device dependent error masks M0 and M1 are applied to W2 as described above to generate W2'. In the example, W2'=1010100111. The third iteration is similar to the second one, and so on. In the last iteration (the nth iteration), Wn−1 is used to do the forward propagation, and the gradients are calculated for the iteration. The gradients are then used to update Wn−1 to Wn=0011000110. Finally, the device dependent error masks M0 and M1 are applied to Wn as described above to generate Wn'. In the example, Wn'=1010000111. Wn' are the actual weights that will make the neural network work accurately.

As described elsewhere herein, in step 6 of the methodology of FIG. 1, the device dependent weight matrix that will make the neural network work accurately that is generated in step 4 is deployed to the target device 8. Thus, for the present exemplary embodiment, step 6 involves deploying Wn' onto target device 8. In the exemplary embodiment, this is not performed by simply writing Wn' into target device 8 using normal write procedures for DRAM stack 10 because such a process would expose Wn' to piracy. Instead, step 6 is performed by writing Wn into target device 8 using a reduced writing time (e.g., tWR timing as defined in the JEDEC standard) by configuring memory controller 11 to do so that is the same as the reduced restore duration time (e.g., reduced tRAS) that was used to create the device dependent error masks M0 and M1. Writing Wn into DRAM stack 10 in this manner will, as a result of the "stuck" cells of DRAM stack 10, actually cause Wn' to be written into DRAM stack 10 (in the example used above, cells 1 and 10 will be automatically set to 1 during this process and cells 4 and 7 will be automatically set to 0 during this process; the other cells will be written as intended). Thereafter, Wn' may be accessed from DRAM stack 10 using a read operation and used by neural network accelerator 12 to perform inference tasks. In the exemplary embodiment, memory controller 11 is configured to implement this read operation, including the associated restore operation, using the same reduced restore duration time that was used to create masks M0 and M1. Since a reduced restore duration time is used in each such read operation, the neural network inference speed will be increased and energy consumption will be deceased as described elsewhere herein. Specifically, the present inventors have shown that by injecting 0.1% to 5% memory errors during generation of the device dependent error mask M0 and M1, an average of 72% performance improvement and 44% energy reduction over a baseline neural network accelerator may be achieved.

Furthermore, if Wn is somehow pirated and deployed on another device, which has a different error pattern, the actual weights stored in DRAM will not be Wn'. In this way, it is guaranteed that the trained weights Wn can only work well in the specific target device.

Moreover, in the exemplary embodiment, batch normalization is used to improve network accuracy and overcome overfitting. Specifically, as noted herein, a neural network is a layered structure wherein the inputs pass through each layer one by one, and wherein the outputs of the previous layer are used as the inputs for the next layer. In this exemplary embodiment wherein batch normalization is used, after each neural network layer, each element in the output is first subtracted by a value A and then divided by a value B, where A and B are two numbers, generated uniquely for each layer, that are trained in the training phase that employs the device dependent error masks as described herein.

In addition, since the device dependent weight matrix depends on the device dependent error mask(s), it is important to be able to prevent attackers from extracting the device dependent error mask(s) at the client side (i.e., at target device 8). The disclosed concept provides two approaches for defending the device dependent error mask(s) at the client side.

In the first approach, the read path of target device 8 is disabled before release. Specifically, in the exemplary embodiment, neural network accelerator 12 and its DRAM module including DRAM stack 10 and memory controller 11 are packaged together such that only neural network accelerator 12 can fetch data from DRAM stack 10 to compute. A persistent attacker may probe the device dependent error mask(s) by loading its own neural networks and correlating the output to the inputs to detect possible error bits. This, however, is much more difficult and takes longer than a memory march test.

Figure 3:
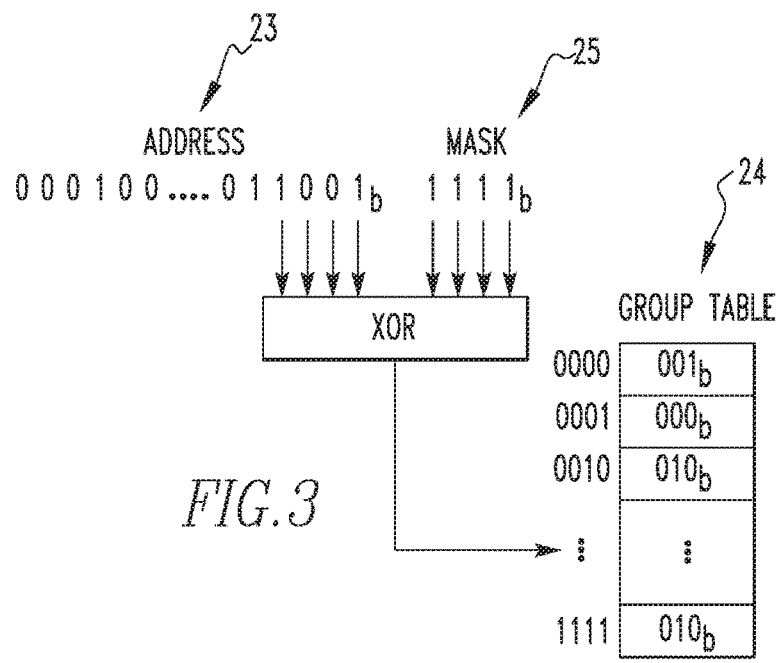
FIG. 3 is a schematic diagram of a methodology for defending the device dependent error mask(s) on a target device according to an exemplary embodiment of the disclosed concept.

The second approach is to adopt a light weight error mask selection mechanism as follows. A small table 24 as shown in FIG. 3 is integrated in memory controller 11 of target device 8. In the exemplary embodiment shown in FIG. 3, the table has 16-entries while each entry contains 3 bits. When accessing a DRAM row of DRAM stack 10, its row address is mapped to an entry in the table using the XOR of the last 4 bits of the address 23 and a 4-bit mask 25. The 3-bit entry content, e.g., '010b'=2 indicates how to adjust the restore duration time (e.g., tRAS) value at runtime. For example, if tRAS is set to 13 ns globally, memory controller 11 effectively reduces the tRAS timing for this row to 11 ns if the mapped table entry contains 2; and there is no adjustment if the entry contains 0. Note that because a neural network has a regular memory access pattern which is predetermined, the table look up can be done before the access. Thus, it is not on the critical path.

The mask 25 and table 24 just described requires 7 bytes. In the exemplary embodiment, it is sensitive information that is encrypted by a public key of neural network accelerator 12. Neural network accelerator 12 decrypts the mask/table before execution using its private key. In this way, even if the attacker can faithfully probe the error mask of the system, the attacker cannot determine the actual device dependent error mask that is used in training.

The mask/table mechanism not only secures the device dependent error mask, but also provide a better control of the error rate in training. In an exemplary target device 8 tested by the present inventors, there were about 0.02% and 0.1% memory errors when tRAS was set to 16 ns and 15 ns, respectively. If a neural network has an error tolerance at about 0.05%, choosing either tRAS=16 or tRAS=15 may not give the optimal configuration. Instead, the server that does the training described herein and establishes the device dependent weight matrix can set the tRAS to be 16 ns globally and then set the values of some entries in the above table to 0 while others to 1, which effectively sets the tRAS for these rows to 16 ns while others being 15 ns. The mix of these lines gives an average error rate that is 0.05%.

Figure 4:
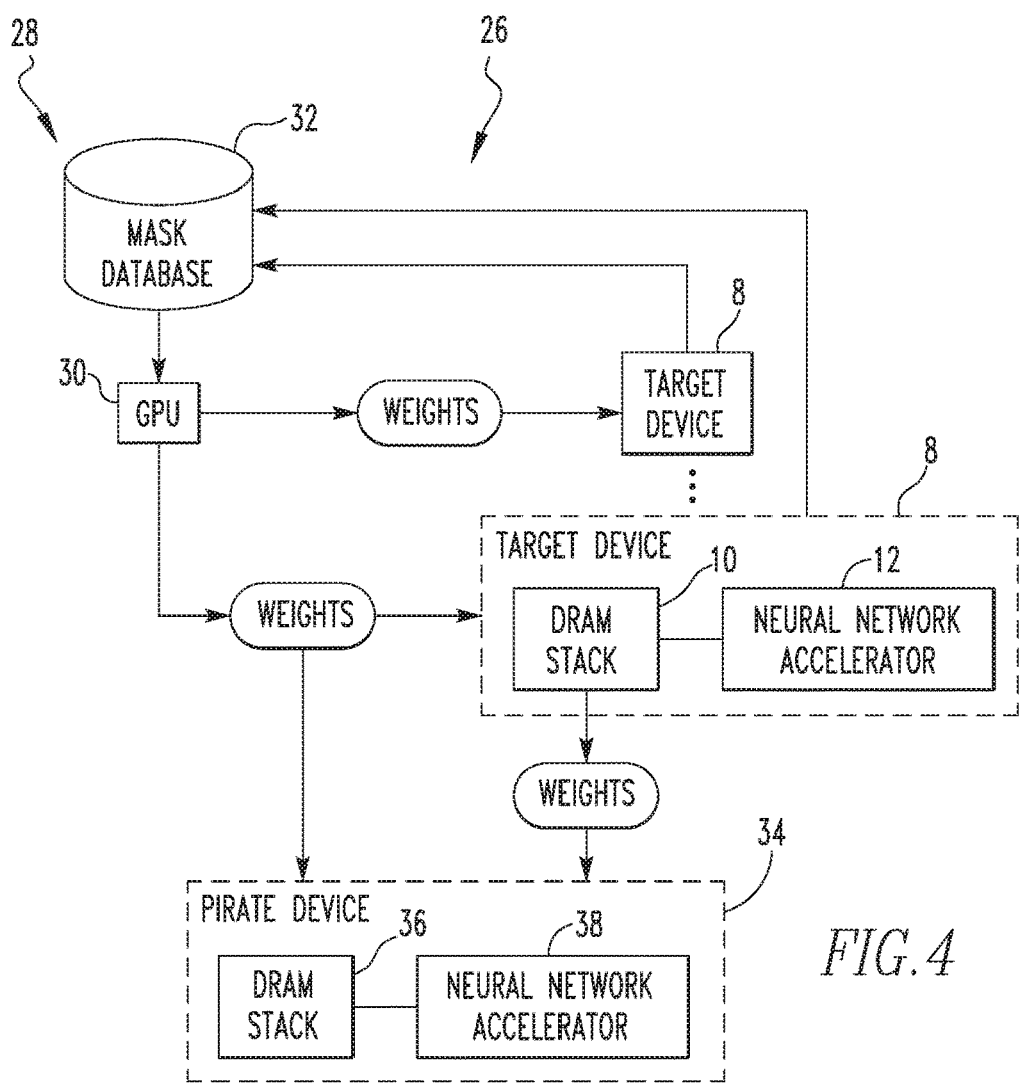
FIG. 4 is a schematic diagram of a system for deploying a neural network according to a further embodiment of the disclosed concept.

FIG. 4 is a schematic diagram of a system 26 for deploying a neural network according to a further embodiment of the disclosed concept. System 26 includes a server location 28 (e.g., a manufacturer) that includes a graphics processing unit (GPU) 30 and a mask database 32. System 26 is structured and configured to deploy the neural network to a plurality of target devices 8 in a manner that will protect the neural network from pirating and deployment to a pirate device 34. System 26 may be used by, for example, a car manufacturer to deploy an object tracking and recognition neural network to target devices 8 in the form of a number of autonomous driving cars. The server, e.g., the car manufacturer in the example, extracts a number of device dependent error mask(s) from each target device 8 (e.g., each car) that it manufactures using any of the embodiments of the methodology described herein, and stores the device dependent error masks in mask database 32. The server, using GPU 30, then integrates the device dependent error mask(s) of each target device 8 in the neural network training process as described herein, which generates a device dependent weight matrix for each target device 8 as part of the neural network model. Next, the neural network model and each device dependent weight matrix are sent to each target device 8 and stored as described herein. Each target device 8 can thereafter employ the neural network model to conduct inference tasks and achieve desired accuracy. However, while an attacker may port the weights to another device (i.e., pirate device 34 having its own DRAM stack 36 and accelerator 38), regardless of whether the pirate device 34 has memory errors or not, the inference accuracy will be below acceptable threshold.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of deploying a neural network on a target drive, comprising:
   extracting a number of device dependent error masks from the target device;
   using the number of device dependent error masks in a training phase of the neural network to generate a device dependent weight matrix for the neural network; and
   storing the device dependent weight matrix in the taarget device for use by the target device to perform inference tasks using the neural network, wherein the target device includes a memory portion, and wherein the extracting the number of device dependent error masks from the target device comprises generating the device error mask using the memory portion, and wherein the memory portion comprises dynamic random access memory (DRAM) including a plurality of cells, wherein the generating the number of device dependent error masks using the memory portion comprises choosing a restore duration time such that a number of the cells will be stuck below threshold, and identifying the number of the cells that will be stuck below threshold based on the chosen restore duration time.

2. The method according to claim 1, wherein a first subset of the cells are each configured to store a binary value of "1" as above threshold and a second subset of the cells are each configured to store a binary value of "0" as above threshold, wherein the number of device dependent error masks includes a first mask and a second mask, and wherein the generating the number of device dependent error masks using the memory portion comprises generating the first mask based on which of the first subset of the cells is stuck below threshold and the second mask based on which of the second subset of the cells is stuck below threshold.

3. The method according to claim 1, wherein the using the number of device dependent error masks in the training phase of the neural network to generate the device dependent weight matrix comprises, during each of a number of training epochs, (i) applying the number of device dependent error masks to a first weight matrix to create a new weight matrix, (ii) using the new weight matrix in a forward propagation though the neural network, (iii) calculating gradients for the training epoch in a backward propagation though the neural network, and (iv) updating the first weight matrix using the gradients.

4. The method according to claim 1, wherein the using the number of device dependent error masks in the training phase includes a final training epoch wherein a final device dependent weight matrix is generated, wherein the device dependent weight matrix is generated by applying the number of device dependent error masks to the final device dependent weight matrix, and wherein the storing the device dependent weight matrix in the target device comprises writing the final device dependent weight matrix to the DRAM using a write time that is equal to the chosen restore duration time.

5. The method according to claim 4, further comprising storing in the target device information indicative of the chosen restore duration time.

6. The method according to claim 5, wherein the information indicative of the chosen restore duration time is stored in the target device in an encrypted manner.

7. The method according to claim 5, wherein the information indicative of the chosen restore duration time is stored in a table in the target device in a manner wherein the information indicative of the chosen restore duration time is accessible from the table based on an address of the DRAM associated with the writing of the final device dependent weight matrix.

8. The method according to claim 7, wherein the information indicative of the chosen restore duration time is stored in the table in the target device in a manner wherein the infolliiation indicative of the chosen restore duration time is accessible from the table based on the address and a predetermined mask.

9. The method according to claim 8, wherein the information indicative of the chosen restore duration time is stored in the table in the target device in a manner wherein the information indicative of the chosen restore duration time is accessible from the table based a logical XOR of a portion of the address and the predetermined mask.

10. A method of deploying a neural network on a target device, comprising:

extracting a number of device dependent error masks from the target device;

using the number of device dependent error masks in a training phase of the neural network to generate a device dependent weight matrix for the neural network; and storing the device dependent weight matrix in the target device for use by the target device to perform inference tasks using the nueral network, wherein the extracting, the using and the storing steps are performed by a manufacturer of the target device.

11. The method according to claim 10, further comprising:

extracting a number of additional device dependent error masks from each of a plurality of additional target devices manufactured by the manufacturer;

using each of the number of additional device dependent error masks in a training phase of the neural network to generate an additional device dependent weight matrix for the neural network for each the plurality of additional target devices; and storing each additional device dependent weight matrix in a respective one of the additional target devices for use by the additional target device to perform inference tasks using the neural network.

12. The method according to claim 11, further comprising storing the number of device dependent error masks and the number of additional device dependent error masks in a mask database associated with the manufacturer.

13. An electronic device configured to implement a nueral network, comprising:

a processing portion; and a memory portion storing a device dependent weight matrix for use by the procession portion to perform inference tasks using the neural network, wherein the device dependent weight matrix is based on a number of device dependent error masks extracted from the electronic device, wherein the memory portion comprises dynamic random access memory (DRAM) including a plurality of cells, wherein the number of device dependent error masks are based on a restore duration time for the DRAM that causes a number of the cells to be stuck below threshold.

14. The electronic device according to claim 13, wherein the processing portion is a neural network accelerator.

15. The electronic device according to claim 13, wherein the memory portion further comprises a memory controller structured and configured to perform read operations to access the device dependent weight matrix from the DRAM for use by the processing portion, wherein the read operations include a restore operation that uses the restore duration time that causes a number of the cells to be stuck below threshold.

16. The electronic device according to claim 13, wherein the memory portion stores information indicative of the restore duration time.

17. The electronic device according to claim 13, wherein the device dependent weight matrix is generated in a training phase of the neural network that includes a final training epoch wherein a final device dependent weight matrix is generated, wherein the device dependent weight matrix is generated by applying the number of device dependent error masks to the final device dependent weight matrix, and wherein the device dependent weight matrix is stored in the memory portion by writing the final device dependent weight matrix to the memory using a write time that is equal to the restore duration time.

* * * * *

UNITED STATES PATENT AND TRADEMARK OFFICE
CERTIFICATE OF CORRECTION

PATENT NO. : 11,531,877 B2
APPLICATION NO. : 16/164964
DATED : December 20, 2022
INVENTOR(S) : Youtao Zhang et al.

It is certified that error appears in the above-identified patent and that said Letters Patent is hereby corrected as shown below:

In the Claims

Column 10, Line 57, "infolliiation" should read --information--

Signed and Sealed this
Fourteenth Day of March, 2023

Katherine Kelly Vidal
*Director of the United States Patent and Trademark Office*